United States Patent [19]
Lee

[11] Patent Number: 5,349,657
[45] Date of Patent: Sep. 20, 1994

[54] METHOD OF AUTOMATING UPLOADING OF HELP PANELS

[75] Inventor: Adrienne Y. Lee, Grapevine, Tex.

[73] Assignee: International Business Machines Corporation, Armonk, N.Y.

[21] Appl. No.: 49,229

[22] Filed: Apr. 19, 1993

Related U.S. Application Data

[63] Continuation of Ser. No. 634,279, Dec. 21, 1990, abandoned.

[51] Int. Cl.⁵ .......................... G06F 15/16; G06F 7/00
[52] U.S. Cl. .................................. 395/650; 395/600; 395/200; 364/241; 364/242.3; 364/DIG. 1
[58] Field of Search ................ 395/650, 600, 200; 364/241, 242.3, DIG. 1

[56] References Cited

U.S. PATENT DOCUMENTS

| | | | |
|---|---|---|---|
| 4,509,122 | 4/1985 | Agnew et al. | 364/200 |
| 4,999,766 | 3/1991 | Peters et al. | 364/200 |
| 5,065,360 | 11/1991 | Kelly | 364/800 |

Primary Examiner—Gareth D. Shaw
Assistant Examiner—A. Katbab
Attorney, Agent, or Firm—David A. Mims, Jr.

[57] ABSTRACT

A method of automating HELP panel uploading in a data processing system is disclosed. A Multiple Virtual Storage (MVS) environment is created by allocating a Virtual Storage Access Method (VSAM) cluster and installing it in a Customer Information Control System region (CICS) executing OfficeVision/Multiple Virtual Storage (OV/MVS). HELP panels assembled as Personal Computer (PC) batch files are uploaded and placed in temporary storage within OV/MVS. OV/MVS facilities are used to move the PC batch files from temporary storage and convert the files to MVS formatted files. The converted files are placed in a special save area. Shared document are created using the converted PC files from the special save area used as HELP panel header data.

2 Claims, 5 Drawing Sheets

The following are flow charts for the above TPNS programs:

METHOD OF AUTOMATING UPLOADING OF HELP PANELS

This application is a continuation of Ser. No. 07/634,279 filed on Dec. 21, 1990, now abandoned.

CROSS REFERENCE TO RELATES APPLICATION

This application is related in subject matter to the following application filed concurrently herewith and assigned to a common assignee:

Application SER. No. 08/042,843 filed by Lee entitled "Method of Automating A Build Verification Process".

The foregoing co-pending application is incorporated herein by reference.

1. Field of the Invention

This invention relates to the automation of manual tasks required for testing processes in a data processing system, and more particularly, to the automation of the HELP panel upload process through the use of the Teleprocessing Network Simulator (TPNS) terminal and network simulation tool.

2. Background of the Invention

The automation of repetitive human tasks in a HELP panel upload process leads to increased productivity and improved quality. HELP panels are special panels available to aid the user of a particular program. The HELP panels are usually accessed by pressing a key often identified in a list on a menu panel. After viewing the HELP panel, the user is given a choice of which panel is to be displayed next by means of another list of keys on the HELP panel. Uploading the HELP panels consists of moving the text of the HELP panels from a work station/Personal Computer where they are created, to a host environment where the HELP panels are stored. Uploading is required each time a change is made to one of the panels resulting in a large number of upload operations.

The upload problem is further exacerbated when software products require National Language Support (NLS). NLS support requires translation of user viewed English language panels into its foreign equivalents. For a product like OfficeVision/Multiple Virtual Storage (OV/MVS), marketed by the International Business Machines Corporation, National Language Support (NLS) required translations of over 130 HELP panels into over 19 foreign languages.

The OV/MVS HELP panels are created as flat files using an Interactive Work Station/Personal Computer (PC). Flat files are one-dimensional or two dimensional arrays often shown as lists or tables of items. Following their creation, the HELP panels are uploaded in PC format to a Multiple Virtual Storage (MVS) environment. Setup of a special Customer Information Control System (CICS) region is required before uploading to enable the PC files to be reformatted to the host format.

Shared documents are eventually created from the PC files and stored in the Multiple Virtual Storage environment to be used as HELP panels. Creation of the shared documents required typing header information on each of the 130 HELP panels. Mistakes on panels required correction of the PC files and new uploads. Each step in the upload process was done manually and required a skilled and attentive tester to insure a thoroughly tested final product.

In addition, special equipment was necessary to create HELP panels for all NLS languages. A controller (containing the language under test) was required to set-up and link to a special terminal for viewing special characters. The Icelandic and French languages were especially problematic requiring special keyboards as well as the controller.

Consequently, what is needed is a method for automating uploading HELP panels, while eliminating the requirement for special equipment, to insure a through check of the uploaded HELP panels in the shortest possible time.

SUMMARY OF THE INVENTION

This invention relates to a method of automating HELP panel uploading in a data processing system. A Multiple Virtual Storage (MVS) environment is created by allocating a Virtual Storage Access Method (VSAM) cluster and installing it in a Customer Information Control System region (CICS) executing OfficeVision/Multiple Virtual Storage (OV/MVS). HELP panels assembled as Personal Computer (PC) batch files are uploaded and placed in temporary storage within OV/MVS. OV/MVS facilities are used to move the PC batch files from temporary storage and convert the files to Customer Information Control System formatted files. The converted files are placed in a special save area. Shared documents are created using the converted PC files from the special save area used as HELP panel header data.

DETAILED DESCRIPTION

Figure 1:
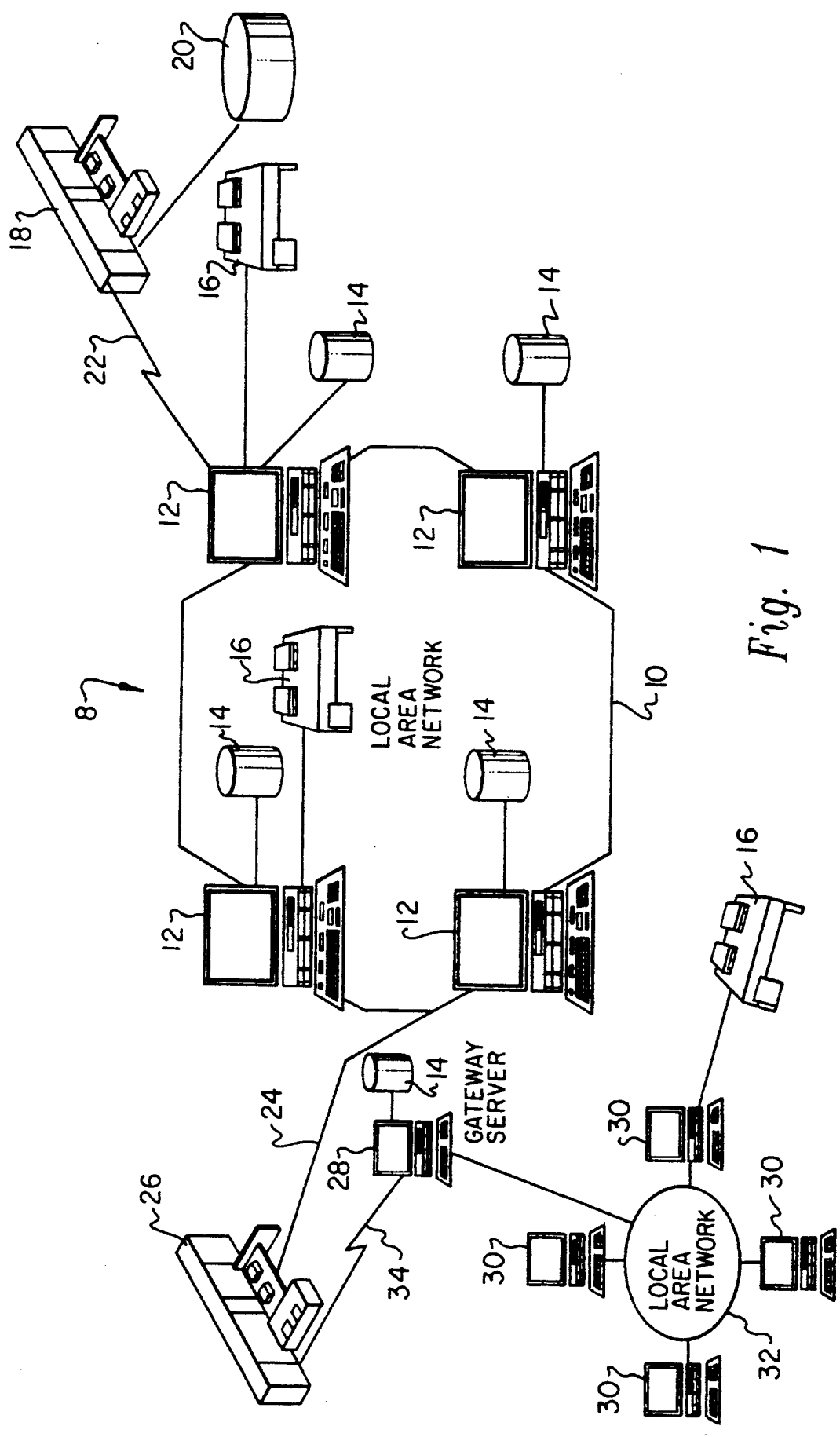
FIG. 1 is a block diagram of a data processing system where this invention may be practiced.

Testing a system or a program against a predetermined series of data to arrive at a predictable result serves the purpose of establishing the acceptability of a system or program. There are three general testing categories consisting of function testing, regression testing, and performance testing.

Function testing consists of testing new programs or subsystems (or to testing a new component of an existing program or subsystem) to ensure that it performs according to specification. Test cases are prepared for each new function according to specification to ensure that new code does the job it was designed to do. The ultimate goal is to test all possibilities including user errors.

Regression testing consists of testing a modified program or subsystem to ensure that changes have not had an effect on the unmodified portions of the program or subsystem. This may include, for example, a determination of whether the parts of the program that were not changed still works the same. In regression testing, all of the test cases that were run against the unmodified program must be run against the modified program. Each test case must produce the same results as before. The ability to repeat a test case ensures that situations that caused errors can be duplicated-a condition often impossible when people carry out testing at terminals.

Performance testing refers to testing a system to ensure that it can handle the projected throughput with acceptable response times. Performance testing ensures that the appropriate number of terminals can be supported or the the application programs can handle the anticipated transaction loads. Parameters such as the size and number of buffer pools maybe changed during performance testing to see what effect these changes have on the system. The above three test categories have all been addressed by various terminal and network stimulator tools, including the IBM Teleprocessing Network Simulator (TPNS) program, marketed by the IBM Corporation of Armonk, N.Y.

The Teleprocessing Network Simulator (TPNS) is a terminal and network simulation tool which has seen extensive use in the prior art as a functional, regression, and performance test tool. Versions of the tool are capable of running on any IBM host processor that supports MVS/370, MVS/XA, MVS/ESA or any Virtual Machine (VM) system that supports Group Control System (GCS). A more detailed description of the Teleprocessing Network Simulator (TPNS) is available in the Teleprocessing Network Simulator (TPNS) information manual, GH20-2487-4, which is incorporated herein by reference. However, heretofore, no one has addressed the problem of automating the manual repetitive tasks required for the above three test categories, and especially the use of TPNS to accomplish the results. Repetitive tasks, as used in this invention, refers to tasks that are not really part of one of the above three testing categories, but are required to accomplish the testing such as uploading HELP panels. Uploading HELP panels consists of moving the panels from a work station/Personal Computer (PC) where they were created to a host environment where the panels are tested.

The HELP panel upload process for the OfficeVision/Multiple Virtual Support (OV/MVS) software product was especially problematic. This software product is marketed by the International Business Machines Corporation (IBM) and contains functions similar to those found in the IBM Professional Office System (PROFS)(R). Like PROFS, OV/MVS gives a user in a Virtual Machine environment office system capabilities such as document creation, document mailing and document storage. OV/MVS also provides National Language Support which requires all text displayed to the end user be translated to a target language. In the case of OV/MVS, this amounted to over 130 HELP panels.

The OV/MVS HELP panels are created using an Interactive Work Station/Personal Computer (PC) as flat files. A flat file is a one-dimensional or two dimensional array: a list or table of items. Following their creation, the HELP panel were uploaded/transferred, still in PC format, to a Multiple Virtual Storage environment. The Customer Information Control System (CICS) running OV/MVS is the preferred Multiple Virtual Storage environment. CICS is a database management software product available from IBM, Armonk, N.Y. which manages a network of terminals and other communications devices attached to a host processor. A description of the operation can be found in general information manual, GC33-0155-1, published by the International Business Machines Corporation. A special CICS region is required to enable the PC formatted files to be reformatted to the host formation during the uploading process. The PC formatted files are uploaded to the host environment and stored temporarily in an OV/MVS In-basket. The files were then converted into shared document and save in a VSAM data set.

Prior art system required a special controller to set up and link to a special terminal in order to see the special characters from the special terminal. These terminals were required over and above the English controllers used to create the versions used for translation. Languages like Icelandic, French, etc. . . . required the special controllers as well as special keyboards. This was necessary to key in the special characters required to test the product in languages other than English.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store applications or other programs which may be periodically accessed by any user within data processing system 8.

Still referring to FIG. 1, it may be seen that data processing network 8 may also include multiple main frame computers, such as main frame computer 18, which may be preferably coupled to LAN 10 by means of communications link 22. Main frame computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or Interactive Work Station (IWS) which serves to link LAN 32 to LAN 10.

As discussed above with respect to LAN 32 and LAN 10, applications or other programs may be stored within storage device 20 and controlled by main frame computer 18. Of course, those skilled in the art will appreciate that main frame computer 18 may be located a great geographic distance from LAN 10 and similarly LAN 10 may be located a substantial distance from LAN 32. That is, LAN 32 may be located in California while LAN 10 may be located within Texas and main frame computer 18 may be located in New York.

Still referring to FIG. 1, the library 20, is capable of being accessed flexibility and simultaneously by a plurality of users and therefore represents a common repository or shared resource. Unlike the shared library 20, a user's personal or private documents are stored in local resource 14. This local storage resource 14 is usually not shared with other users.

Figure 2:
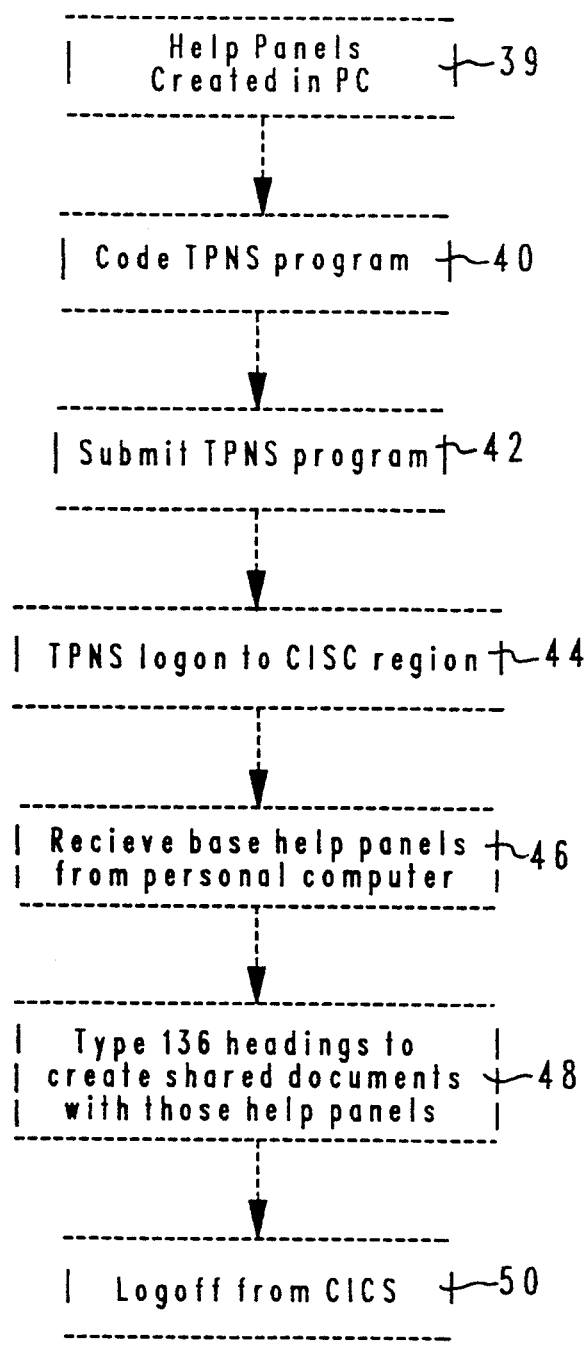
FIG. 2 is a flow diagram of the procedures required to automate HELP panel uploads using this invention.

Turning to FIG. 2, a high level flow diagram of how HELP panels uploads are automated by this invention is shown. The HELP panels are created in a Personal Computer (PC) as shown at block 39. A Teleprocessing Network Simulator (TPNS) program is coded 40 consisting of five modules. The five modules are loaded into 42 a main frame computer 18 similar to that shown in data processing system 8 (FIG. 1). Program statements in the Teleprocessing Network Simulator (TPNS) program cause the establishment of a terminal session 44 by logging onto the Customer Information Control System (CICS) region. CICS is a general purpose software product marketed by the IBM Corporation that reduces the effort needed for terminal-orientated transaction programming. The CICS product interfaces between user-written application programs, teleprocessing access methods, and data base managers.

After establishing the terminal session has been established, the Teleprocessing Network Simulator program will setup the CICS region to receive HELP panels 46 from an Interactive Work Station (IWS) or Personal Computer (PC). The TPNS program will then type 48 the headings for the HELP panels and convert them to shared documents. The terminal session 50 will be terminated in the Customer Information Control System (CICS) by performing a log-off operation.

Figure 3:
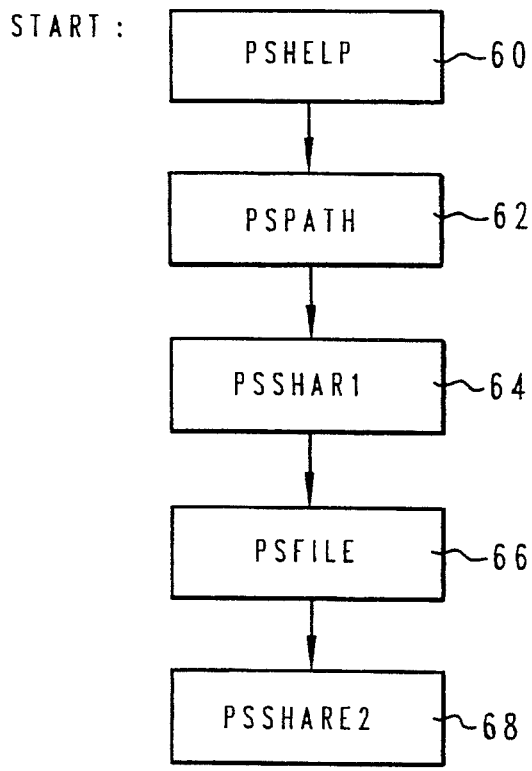
FIG. 3 is a block diagram of the Teleprocessing Network Simulator modules needed to automate HELP panel uploads using this invention.

Turning to FIG. 3, a block diagram is shown of the Teleprocessing Network Simulator (TPNS) program modules executed to automate uploading the HELP panels. The Personal Service Help "PSHELP" panel module 60 contains the network definition representing the lines, terminals and devices to be simulated. The Personal Service Path "PSPATH" module 62 contains instructions to verify the Personal Service (PS) HELP panel Virtual Storage Access Method (VSAM) data set and for signing onto OfficeVision/MVS.

Virtual Storage Access Method (VSAM) is a technique encompassed in a software product marketed by the IBM Corporation which permits indexed or sequential processing of fixed and variable-length records on direct access devices. The records in a VSAM data set or file can be organized in logical sequence by means of a key field (key sequence), in the physical sequence in which they are written on the data set or file (entry-sequence), or by means of relative-record number.

The Personal Service Share-1 "PSSHARE1" module 64 serves as the main entrance for the information to be entered on the HELP panels. The Personal Service File "PSFILE" module 66 files all the uploaded help panels while the Personal Service Share 2 "PSSHARE2" module 68 copies all heading uploaded into memory and into OV/MVS panels when creating shared documents for the Personal Service Help panel. Finally, a FINISH module (not shown) defines the procedures required to terminate the session (logoff).

Figure 4:
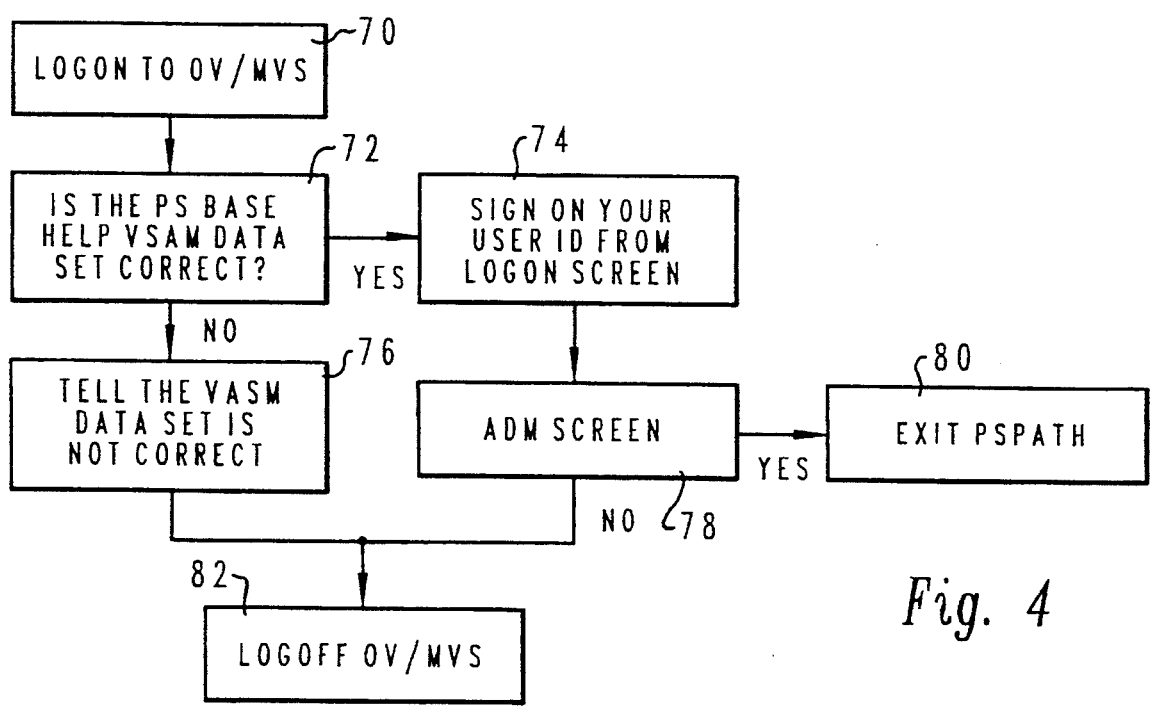
FIG. 4 is a flow chart of the steps taken within the Teleprocessing Network Simulator Personal Service Path "PSPATH" module for automating the uploading of HELP panels.

Referring now to FIG. 4, the Personal Service Path "PSPATH" module 62 of the Teleprocessing Network Simulator (TPNS) program will be described. The PSPATH module attempts to logon 70 onto OV/MVS and check to see if the Personal Service (PS) Base HELP VSAM data set 72 is correct. If the proper VSAM data set is loaded, the TPNS program signs onto OV/MVS with an assigned user Identification (ID) 74. Proper logon results in displaying the administrator (ADM) screen 78. If the screen fails to appear, the TPNS program will logoff and terminate the OV/MVS session 82. Logoff from the OV/MVS session will also occur if the VSAM data set is found to be incorrect 76. If proper operation occurs, and the ADM screen appears, the TPNS program will exit the PSPATH module and the PSSHARE1 module will be executed.

Figure 5:
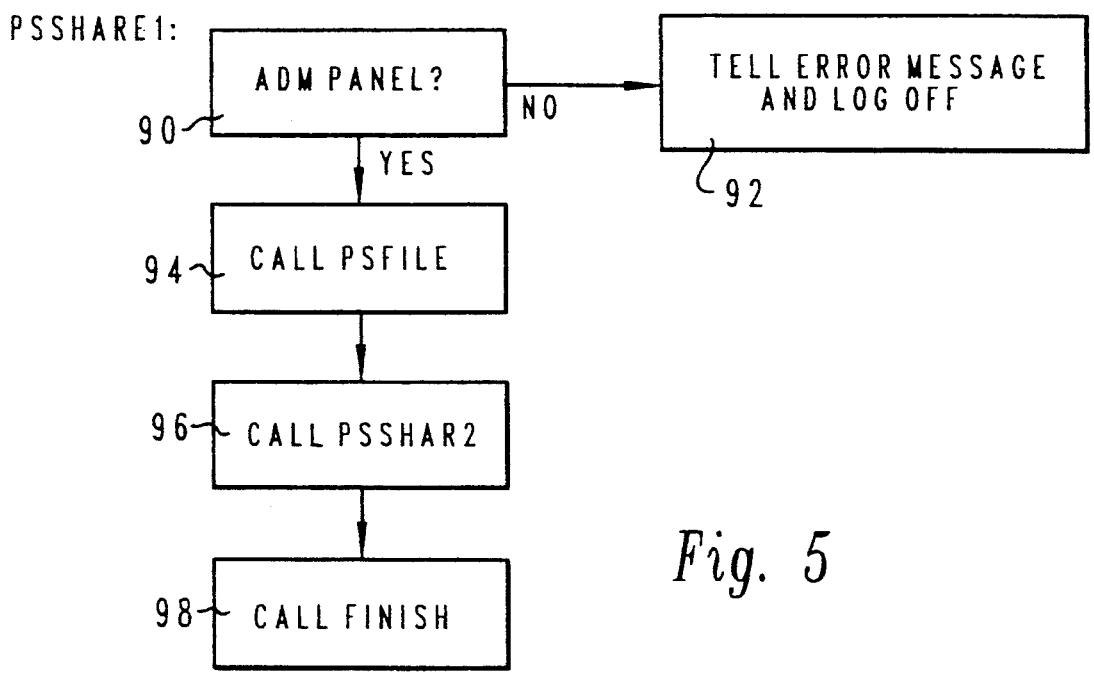
FIG. 5 is a flow chart of the steps taken within the Teleprocessing Network Simulator Personal Service Share-1 "PSSHARE1" module for automating the uploading of HELP panels.

Turning to FIG. 5, the PSSHARE1 module of the Teleprocessing Network Simulator (TPNS) program will be described. The TPNS program will check for the presence of the ADM panel 90. If the screen is not present, an error message 92 will be printed and TPNS will terminate the OV/MVS session by issuing a log-off commands. However, if the ADM panel is found, calls will be made in turn to the PSFILE module 94, the PSSHARE2 module 96 and the FINISH module 98.

Figure 6:
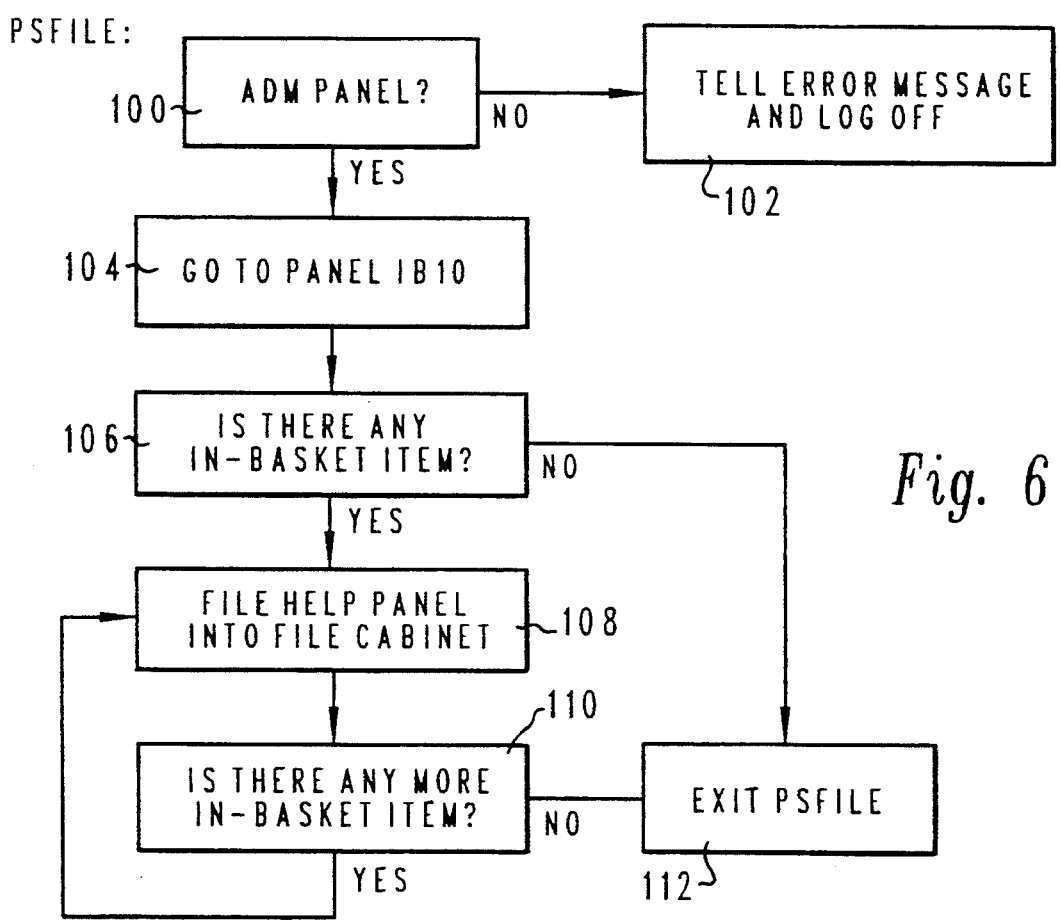
FIG. 6 is a flow chart of the steps taken within the Teleprocessing Network Simulator Personal Service File "PSFILE" module for automating the uploading of HELP panels.

Turning to FIG. 6, the PSFILE module will be described. The TPNS program will first check for the Administrator (ADM) panel 100. If the ADM panel is not active, an error will be printed 102 and a logoff command will be issued to terminate the session. If the ADM panel is active, the In-basket (IB) 10 panel 100 is called. This panel enables a check to be made for HELP panels that have been temporarily stored in a user's In-basket. A check for HELP panel is conducted by querying the in-basket items 106. If there are no in-basket item (no HELP panels), the PSFILE module will be exited 112. If there are in-basket items, they will be filed into a user's file cabinet 108. An in-basket is temporary storage space allocated to a user within the OfficeVision host environment. The program will insure all HELP panels are removed 110 from the in-basket before exiting 112. After exiting the PSFILE module, the PSSHARE2 module will be called and executed.

Figure 7:
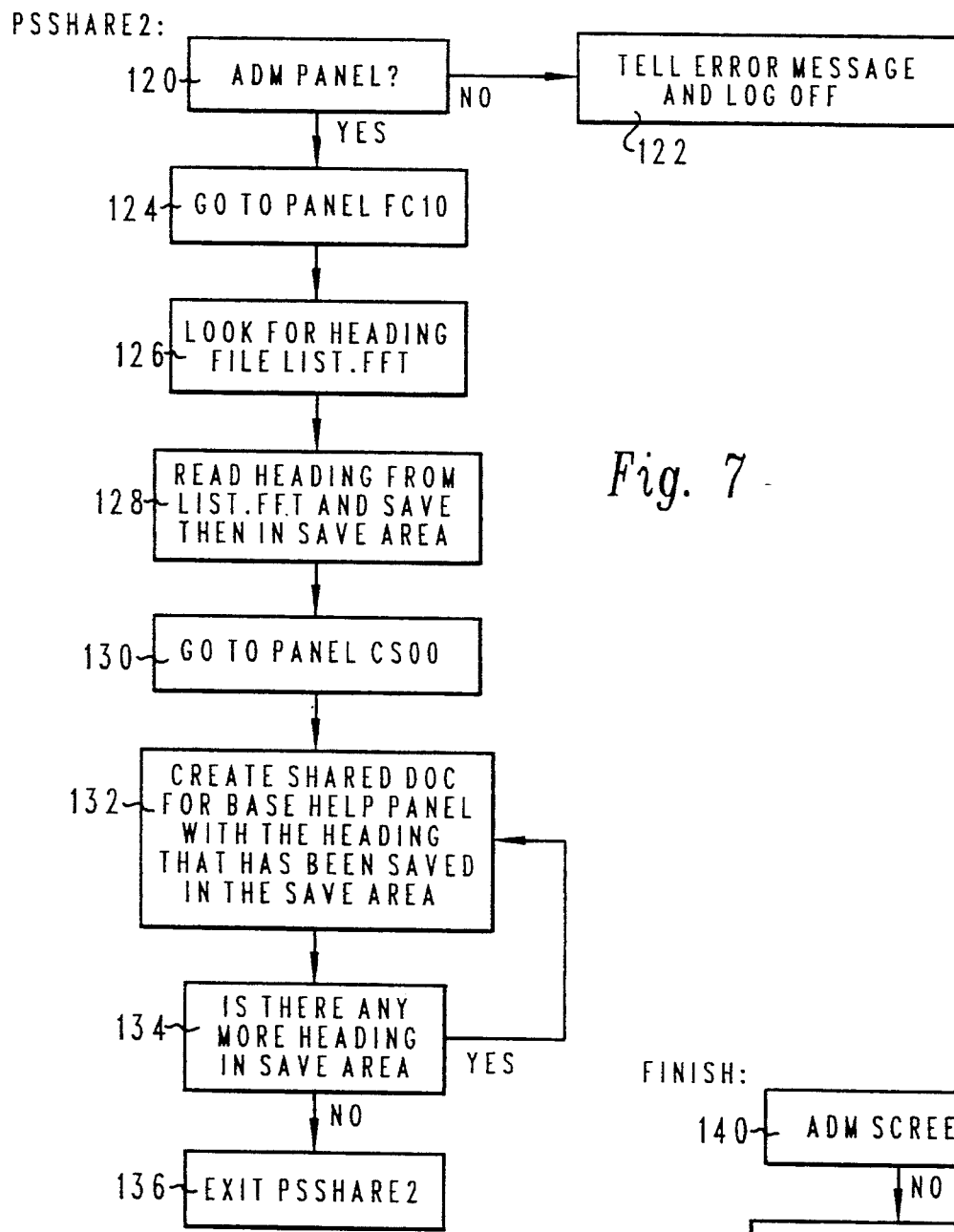
FIG. 7 is a flow chart of the steps taken within the Teleprocessing Network Simulator Personal Service Share-2 "PSSHARE2" module for automating the uploading of HELP panels.

Turning to FIG. 7, the PSSHARE2 module will be explained. The TPNS program will first check for the presence of the Administrator (ADM) panel 120. If the panel is not found, an error message will be printed and the session will be terminated 122. If the ADM panel is active, the File Conversion (FS) 10 panel will be called 124. The TPNS program will look for the heading file "LIST.FFT" 126 which indicate a file list final form text (FFT) document. The headings will then be read from the LIST.FFT and saved into a special save area 128. After reading the headings, Create Shared (CS) 00 document panel 130 will be called. A shared document of HELP panels will then be created using the headings saved into the special save area 132. The program will loop until all heading are read 134. After all headings are read, an exit to the FINISH module will occur 136.

Figure 8:
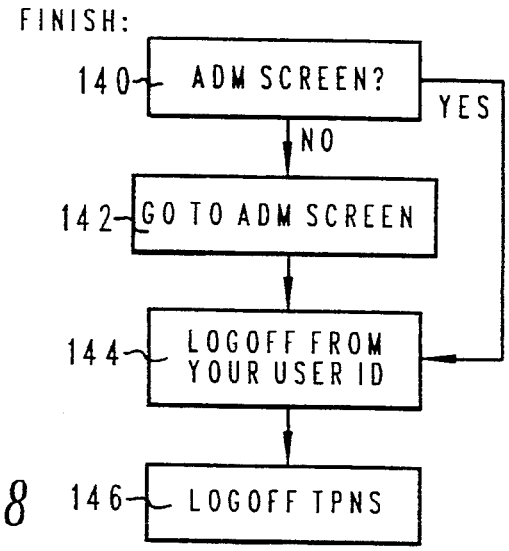
FIG. 8 is a flow chart of the steps taken within the Teleprocessing Network Simulator FINISH module for automating the uploading of HELP panels.

Turning to FIG. 8, the FINISH module will be described. The TPNS program will check for the administrator (ADM) screen 140. If active, the program will terminate the session 144 and the TPNS program will logoff 146. If the ADM screen is not active, a call will be made for it 142 and logoff 144 and termination of the TPNS program 146 will occur.

In summary, this invention discloses a method of automating the manual tasks required during HELP panels uploads during product development. A network definition deck defining the lines, terminals and devices under development is created. Verification is made of the special storage requirements on the Virtual Storage Access Method (VSAM) data set. Signing onto OfficeVision/Multiple Virtual Storage is accomplished and test sequences are initiated to accomplish the transfers of HELP panel flat files created on a Personal Computer (PC) to the Multiple Virtual Storage environment. The files are stored temporarily in an in-basket. Permanent storage of the files are made before creation of shared files. The shared files are created using the permanent information as header information on each file.

While the invention has been particularly shown and described with reference to preferred embodiments thereof, it will be understood by those skilled in the art that various changes in form and details may be made therein without departing from the spirit and scope of the invention.

What I claim is:

1. A method implemented in a data processing system having at least one host processor for automating the uploading of HELP panels created in one of a plurality of workstations in a first file format and converting the HELP panels within said host processor to a second filed format, said method comprising the steps of:

provided a plurality of HELP panels in one of a plurality of workstations in said data processing system in said first file format describing text to aid a user in the use of an application program in a host environment;

automatically uploading and converting said plurality of HELP panels from said one of said plurality of workstations to said host environment in response to loading and executing coded teleprocessing network simulator modules into said host by said user, said coded teleprocessing network simulator modules providing a simulation of a network with which said said plurality of HELP panels interacts, said teleprocessing network simulator modules performing the steps of:

establishing a communication link between said workstation and said host environment by logging onto a Customer Information Control System (CICS) region within said host environment;

providing storage within said host environment to receive said plurality of HELP panels;

transferring said plurality of HELP panels from said workstation to storage in said Customer Information Control System (CICS) region within said host environment in a headings file in said first file format over said communication link;

creating a plurality of shared HELP panels in said Customer Information Control System (CICS) region within said host environment in a second file format usable by said host environment by reading and converting said headings file to said second file format in the storage of said host environment, wherein said shared HELP panels are accessible by said user of said application program; and terminating said communication link between said workstation and said host environment by logging off said Customer Information Control System (CICS) and ending the execution of the coded teleprocessing network simulation modules.

2. The method as recited in claim 1 wherein the step of creating a plurality of HELP panels includes the step of creating said plurality of HELP panels in a flat file format.

* * * * *